United States Patent [19]

Hamilton

[11] Patent Number: 5,255,558
[45] Date of Patent: Oct. 26, 1993

[54] METHOD AND DEVICE FOR TESTING CONDOMS

[76] Inventor: Terry W. Hamilton, P.O. Box 49, Bulverde, Tex. 78163-0049

[21] Appl. No.: 886,736

[22] Filed: May 21, 1992

[51] Int. Cl.$^5$ ............................................. G01M 3/04
[52] U.S. Cl. ..................................... 73/40; 73/37
[58] Field of Search ............... 73/40, 41.2, 45.5, 37; 128/844

[56] References Cited

U.S. PATENT DOCUMENTS

| | | | |
|---|---|---|---|
| 2,213,113 | 8/1940 | Youngs | 73/41.2 |
| 2,244,591 | 6/1941 | Youngs et al. | 73/41.2 X |
| 2,292,983 | 8/1942 | Youngs | 73/41.2 |
| 2,297,837 | 10/1942 | Loughnane | 73/40 X |
| 2,370,945 | 3/1945 | Fields | 73/40 |
| 2,567,926 | 9/1951 | Dunkelberger | 73/40 X |
| 4,875,358 | 10/1989 | Marsh | 73/40 |
| 4,889,266 | 12/1989 | Wight | 223/111 |
| 4,909,413 | 3/1990 | McCutcheon | 221/1 |
| 4,915,272 | 4/1990 | Vlock | 223/111 |
| 4,974,393 | 12/1990 | Rich | 53/433 |
| 5,033,256 | 7/1991 | Rupp | 53/570 |
| 5,050,426 | 9/1991 | Torres-ibanez | 73/45.5 |
| 5,097,697 | 3/1992 | Carnal et al. | 73/40 |
| 5,129,256 | 7/1992 | McGlothlin | 73/40 |

*Primary Examiner*—Hezron E. Williams
*Assistant Examiner*—Joseph W. Roskos
*Attorney, Agent, or Firm*—Gunn, Lee & Miller

[57] ABSTRACT

A method and device (10) for testing condoms, the device (10) comprises a perforated, elongated plastic, cylindrical member (12) having a head (14) at one end thereof, a body (16) and a base (18) at the other end thereof. Fitable into the hollow interior of cylindrical member (12) is a plunger assembly (30) with a piston (78) thereon. Perforations (20) in the body (16) of the cylindrical member (12) provide communication with a sleeve (28) in which the piston (78) rides. A condom is unrolled over cylindrical member (12) and sealed airtight to the base (18) thereof. Pumping the piston (78) inflates the condom where it can be inspected for perforations, tears, and porosity. A flap valve (35) in the piston (78) allows air in the condom to escape through the perforations (20) and through a whistle means (42) to provide an audio signal whose pitch is a function of velocity of air through the signal and thus indicative of the porosity of the condom membrane.

21 Claims, 6 Drawing Sheets

METHOD AND DEVICE FOR TESTING CONDOMS

FIELD OF THE INVENTION

This invention relates to condom testing devices, more particularly, to a device for testing condoms for tears, perforations and porosity, comprising a perforated cylindrical member to seal a condom thereto and providing for an inner chamber with a piston for inflating the condom secured to the member.

BACKGROUND

This invention is a new health aid that has been designed to test the integrity of contraceptives (condoms) that are used during sexual activities. It is designed to be an in-home test aid that is simple and effective; giving an evaluation of the integrity of the contraceptive that is to be used.

Contraceptives are the only health aid currently on the market which provide adequate protection from sexually transmitted diseases. However, if the contraceptive is defective due to age, package failure, or manufacturing flaws, there is an increased risk of sheath failure and of being exposed to sexually transmitted diseases.

Health care specialists are alarmed at the meteoric increase in the spread of sexually transmitted diseases (STD). This concern is heightened by the tragic advent of the AIDS epidemic. Hardly a day goes by where the media does not report that another celebrity has either contracted the HIV virus or died of AIDS. In the United States alone, authorities estimate that over a million people are HIV positive and are potentially transmitters of the AIDS virus. Moreover, because of the insidious nature of the AIDS virus, one may be a carrier and not know it.

Both the medical community and various state and federal governmental agencies have urged the general public, especially those who are sexually active, to practice "safe sex." The practice of safe sex embodies the use of a contraceptive in the form of a sheath or a condom to prevent the passage of body fluids from the male to the female or vice versa during the act of sexual intercourse. However, even safe sex is only as safe as the integrity of the condom membrane. Before the advent of AIDS, condom breakage or leakage during use was not potentially a life-threatening matter. Indeed, on the contrary, it may have life-initiating consequences. While neither consequence may be desirable to the user, the former is potentially far graver.

Therefore, it is desirable for those sexually active individuals, both male and female, who have a number of partners, to have a device that is of simple construction, inexpensive and easy to use in the privacy of one's home which will effectively test a condom prior to use for tears, perforations and porosity. Of course, it is hoped that the condoms are manufactured with sufficient quality control procedures to prevent any imperfect condoms from proceeding to the marketplace. Unfortunately, no quality control system is 100% effective. Not only do some condoms pass through even the most efficient quality control procedures, through improper sorting, but packaging problems, problems in transport, in the marketing chain, through vandalism, and through lack of proper home storage and may provide for tears, perforations, porosity problems or other potential circumstances for sheath failure of a condom during use.

A number of prior art devices and methods are directed to the testing of surgical gloves and condoms. However, those devices represented by, for examples, U.S. Pat. Nos. 4,915,272, 4,889,266, and 4,909,413 are all large and complex devices designed for and intended to be used either in a hospital setting or in a factory setting.

U.S. Pat. No. 4,875,358 (Marsh et al. 1989) discloses a method and device for testing a condom, device having an elongated generally cylindrical forming member made up of made up of nesting annular elements, inflatable with a bellows element attached to an open end of the cylindrical chamber. The Marsh device, while having advantages over the other patents set forth above, still fails to provide for a means of positively testing the permeability, beyond a visual check. Nor does the Marsh device provide for the devices to perpetuate the easy rerolling of the condom. All these and more are provided in the simple device of Applicant's invention.

None of the devices disclosed produce a simple, easy to use, inexpensive to manufacture device which will provide for an unsophisticated and simple method of inhome testing of a condom for sheath integrity just prior to use. Moreover, none of the present devices provide for a condom-testing device or method which allows the tester to effectively re-roll the condom back into its pretested configuration.

This invention is designed to provide the sexually active consumer with a test of the integrity of the contraceptive that will be used. It will allow the individual to test the contraceptive for any defect such as holes or rips that would expose the user to a health risk. To operate, the individual adjusts a contraceptive over the air chamber and secures the collar lock ring around the base into the channel provided on the chamber. This locks tight forming an air-tight seal. Push the plunger down and inflate the contraceptive; lock plunger in place by rotation. This seats the plunger collar tab into the lid of the chamber and will hold the plunged down while the individual inspects the contraceptive for defects.

Most condoms are one size. The latex sheath in conjunction with a rubber ring at a distal end thereof provide enough elasticity to properly fit the majority of males. Thus, it is the object of the present invention to provide for a cylinderical member with perforations in the walls thereof, with an outer surface and an inner barrel, the outer surface to receive, by unrolling, the sheath of a condom thereon, and the inner surface to receive a piston therein to force air through the perforations of the cylindrical member into the condom.

It is a further object of the present invention to provide an air release means to allow the air captured in the inflated condom to produce an audio signal indicative of condom integrity.

It is a further object of the present invention to provide for a device comprised of a cylindrical member onto which a condom is unrolled, which cylindrical member is capable of inflating a condom, sealed to the member, and for providing a fluid container sealable to the member into which the inflated condom may be inserted, so it can be checked for air leakage.

These and other purposes will be set forth in the specifications and claims as follows.

SUMMARY OF THE INVENTION

The present invention consists of a method and device for testing condoms, the device comprises a perforated, elongated plastic, cylindrical member having a head at one end thereof, a body and a base at the other end thereof. Fitable into the hollow interior of cylindrical member is a plunger assembly with a piston thereon. Perforations in the body of the cylindrical member provide communication with a sleeve in which the piston rides. A condom is unrolled over cylindrical member and sealed air-tight to the base thereof. Pumping the piston inflates the condom where it can be inspected for perforations, tears, and porosity. A one-way valve in the pisfon allows air in the condom to escape through the perforations and through a whistle means to provide an audio signal whose pitch is a function of velocity of air through the signal and thus indicative of the porosity of the condom membrane.

DETAILED DESCRIPTION OF THE PREFERRED EMBODIMENT

Figure 2:
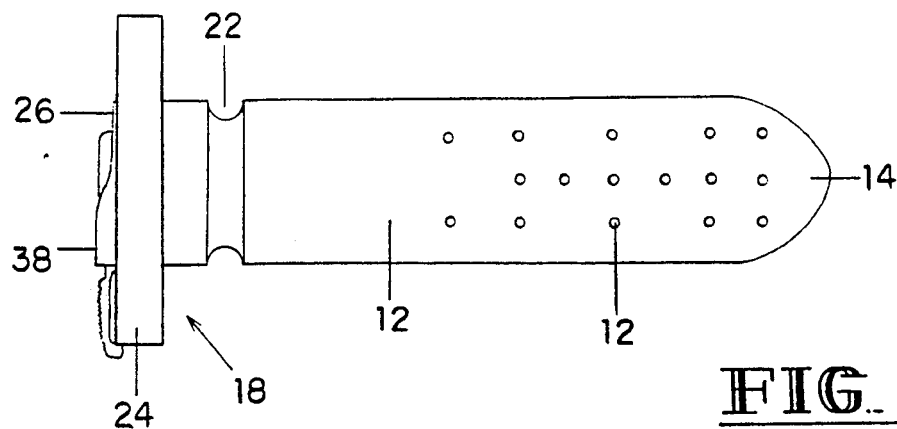
FIG. 2 is a side elevational view of the condom-testing device of Applicant's present invention.
Figure 1:
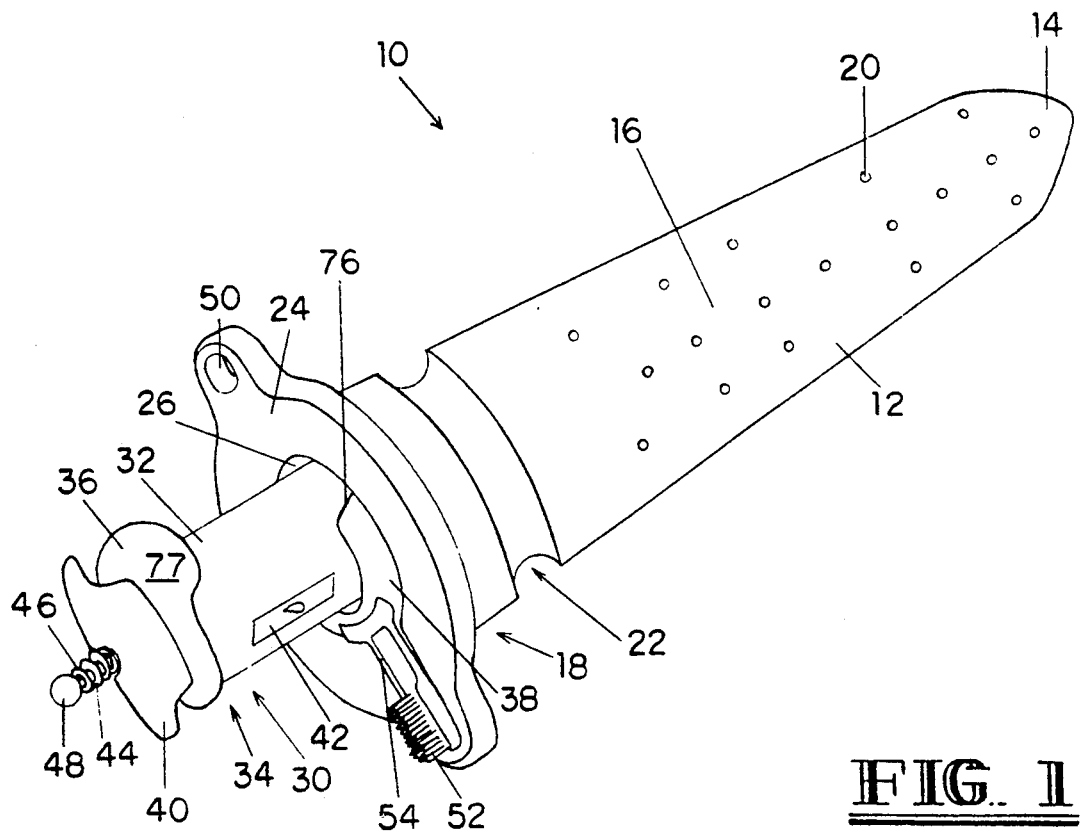
FIG. 1 is a perspective view of the condom-testing device of Applicant's present invention.
Figure 3:
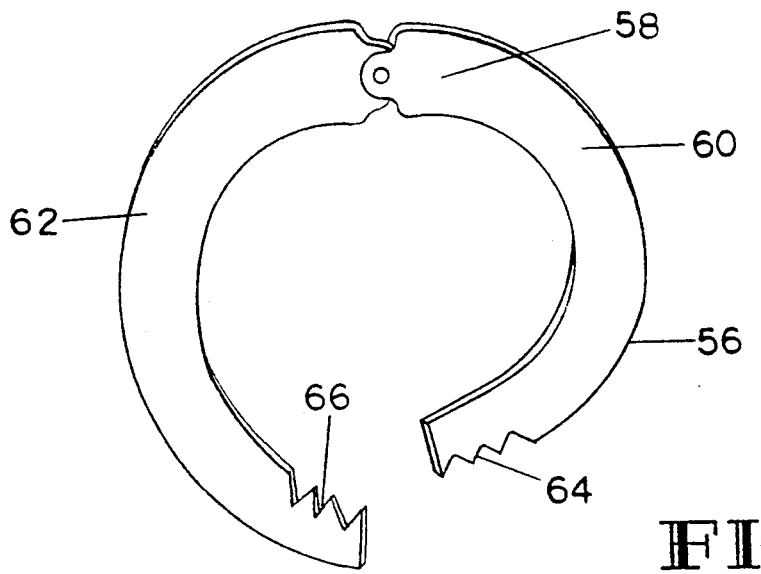
FIG. 3 is a side elevational view of the collar lock ring of Applicant's present invention.
Figure 4:
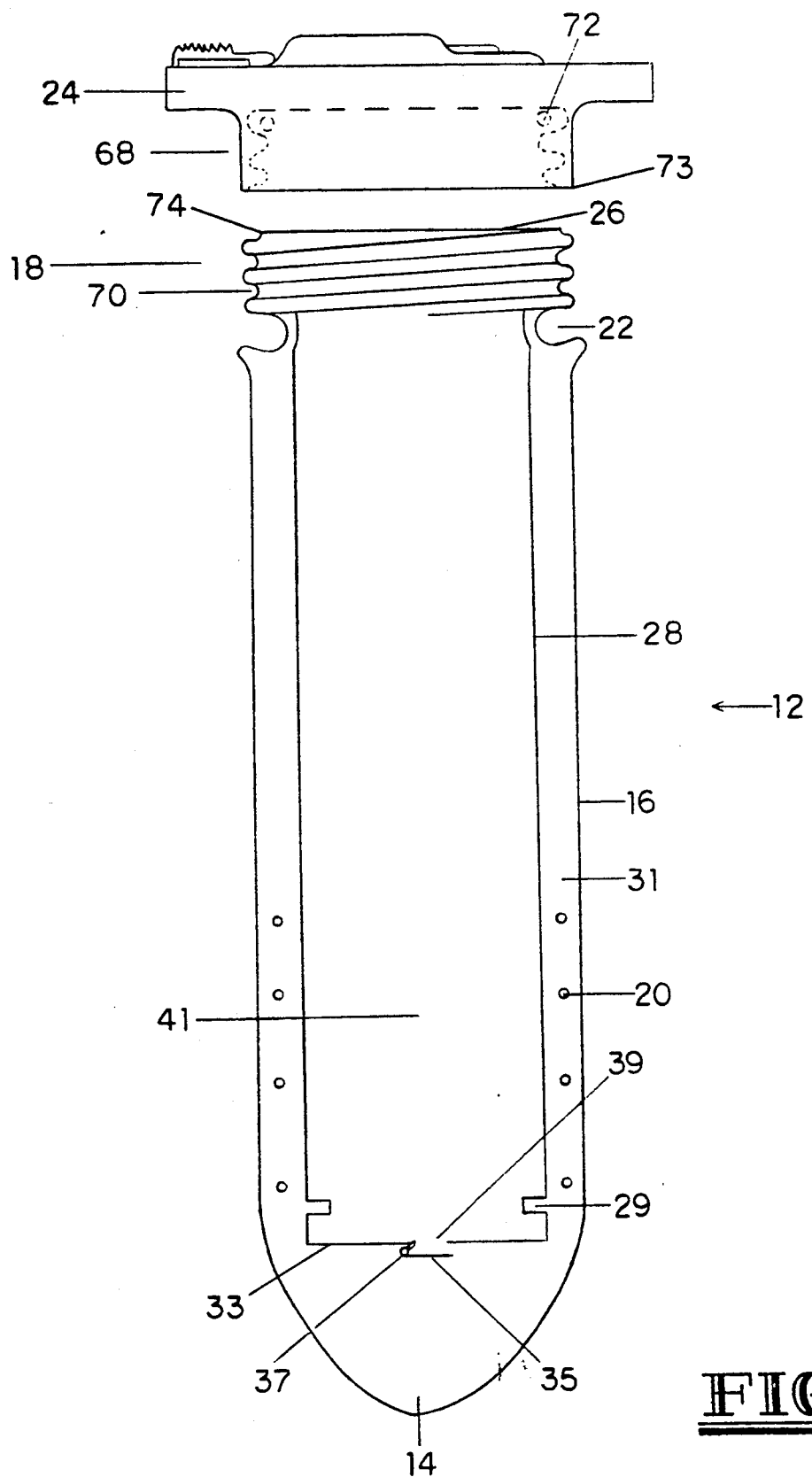
FIG. 4 is a cut-away view of the cylindrical member of the condom-testing device of Applicant's present invention with the plunger portion thereof removed therefrom.

Turning now to FIGS. 1, 2, 3 and 4 it is seen that the condom-testing device (10) Applicant's present invention comprises and elongated, hollow cylindrical member (12) dimensioned to resemble an erect penis of an adult male. Cylindrical member (12) is seen to have a head portion (14), a body portion (16) and a base (18). Again, the shape of cylindrical member (12) is clearly designed to receive on the surface thereof the sheath of a condom deployed at head (14) and unrolled out to base (18). However, the figures disclose perforations or air holes (20) providing communication into body (16) from the surface thereof (see FIG. 4). At base (18) of cylindrical member (12) can be found a perimeter channel (22) encircling cylindrical member (12). Distal to perimeter channel (22) is a tabular flange (24) integral with cylindrical member (12) (FIGS. 1 and 2). In an alternate preferred embodiment, flange (24) may be integral with screw cap (68) as seen in FIG. 4.

Flange (24) and cylindrical member (12) define an open end (26). Cylindrical member (12) is hollow, extending from open end (26) and having inner sleeve (28) with a stop ring (29) projecting from the surface thereof near an end wall (33). Between inner sleeve (28) and body (12) lies a chamber (31). End wall (33) sealing the removed end of inner sleeve (28) is provided with a flap valve (35) having a hinge portion (37) to provide communication between chamber (31) and bore (41), the communication being through port (39) in end wall (33). That is, flap valve (35) provides for communication of gases between chamber (31) and bore (41).

Figure 5:
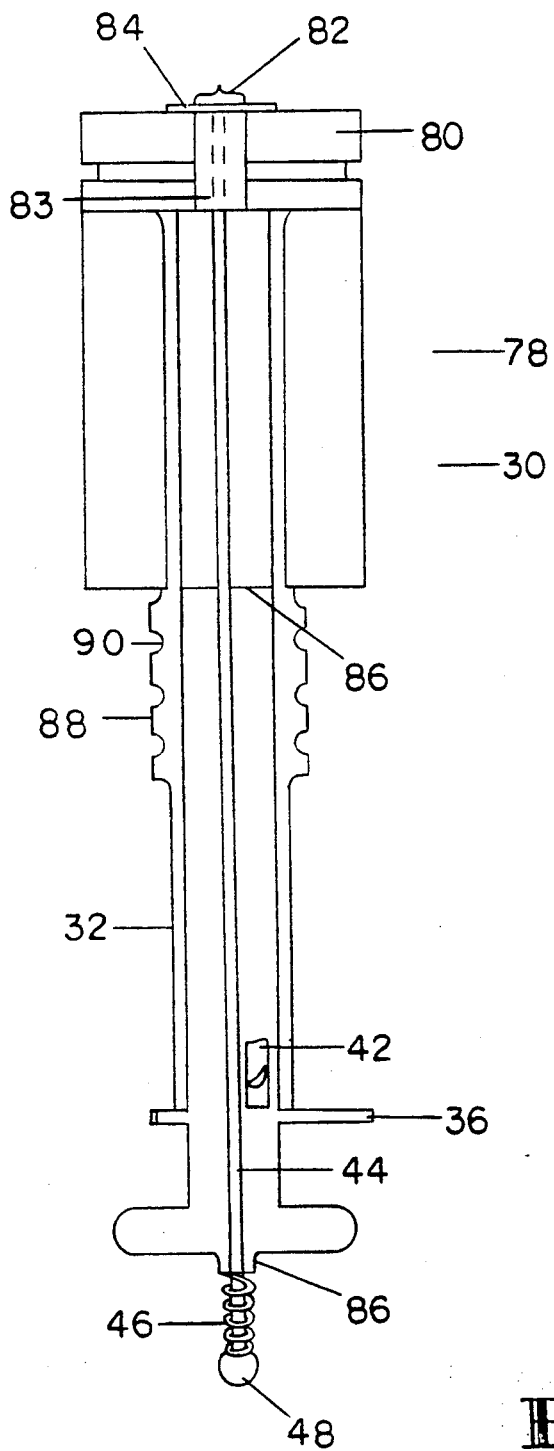
FIG. 5 illustrates the plunger assembly of Applicant's present invention as removed from the sleeve of the cylindrical member.

Turning now to FIGS. 4 and 5, it is seen how a plunger assembly (30) is dimensioned for receipt within bore (41) of inner sleeve (28). More particularly, in FIGS. 1 and 5, it is seen that plunger assembly (30) is comprised of longitudinal barrel (32) having a distal end (34) near open end (26) of cylindrical member (12). Plunger assembly (30) is designed to slide within cylindrical member (12) up to stop ring (29) which coincides with positioning of plunger lock disc (36) adjacent flange locking lip (38). As can be seen in FIG. 1, plunger lock disc (36) is provided with leading edge (77) which is engageable with leading edge (76) of flange locking lip (38). That is, plunger assembly (30) is inserted into bore (31) until reaching stop ring (29) whereupon it is rotated by grasping a barrel cap (40) and twisting until leading edge (77) of plunger lock disc (36) underrides leading edge (76) of flanged locking lip (38), continued rotation will forcibly and sealably secure plunger assembly into bore (41).

Plunger assembly (30) includes a rod (44) extending axially coincident with longitudinal axis of barrel (32). Rod (44) extends through barrel cap (40) and is biased by the action of coil spring (46) which engages outer surface of barrel cap (40) and release button (48) so as to exert and outward force on rod (44).

Completing FIG. 1 it is seen that flange (24) has on the surface thereof lanyard hole (50) for affixing the lanyard thereto so as to hang the device from a hook or the like fixed to a cabinet in one's bathroom, or from which to secure collar lock ring (56). Additionally, it is seen in FIG. 1 that flange (24) is provided with plunger engagement slide (52) which is slidably insertable in sliding engagement groove (54). The function of engagement slide and groove (52) and (54), respectively, will be set forth in more detail below.

Turning now to FIG. 3, the device of Applicant's present invention provides for collar lock ring (56) designed to engage perimeter channel (22) thereby sealing sheath to cylindrical member (12) at base (18) thereof. As can be seen in FIG. 3, collar lock ring (56) is provided with pivot pin (58) pivotally engaging right interlocking member (60) with left interlocking member (62) at proximal ends thereof. At the distal ends of each of interlocking members (60) and (62) are toothed portions (64) and (68) which lockingly and sealingly engage one another such that the circumference of the inner portion of collar lock ring (56) is slightly less than the diameter of perimeter channel (22) thus providing an air-tight fit between the condom and cylindrical member (12).

Turning now to FIG. 4, it is seen that flange (24) will provide base (18) of cylindrical member (12) with a means to thread screw cap (68) to threaded member (70). That is, in use, collar lock ring (56) may be affixed to perimeter channel (22) after which screw cap (68) is screwed down onto threaded member (18) to provide for sealing the ring of the sheath of the condom between the surface of inner locking member (62) and flange (24). However, washer (73) should be provided so as to prevent damage to the condom sheath. Additional features of screw cap (68) are O-ring (72) which provides for an air-sealing fit between screw cap (68) and rim (74).

Turning now to the details of plunger assembly (30) and in conjunction with FIG. 5, it is noted that plunger assembly (30) is comprised of barrel (32) and piston (78) affixed to the distal portion thereof, the piston having a cylindrical crown (80). More specifically, it is seen in FIG. 5 how cylindrically-shaped piston and crown assembly (78/80) is dimensioned for receipt within bore (41) of inner sleeve (28). Material comprising piston/crown assembly (78/80) is close cell foam rubber or the like. It must be slidably and resiliently engage the walls of inner sleeve (28), in relatively air tight fashion. Nipples (82) with sealing collar (84) around the perimeter thereof are attached to the end of rod (44). Force of coil spring (46) against release button (48) will provide a force urging sealing collar (84) against crown (80). It is to be noted at this juncture that rod (44) is provided with guides (86) to maintain its axial alignment in barrel (32). Moreover, FIG. 5 illustrates that sealing collar (84) provides an air-tight seal as it joins crown (80), preventing air from escaping through duct (83) unless release button (48) is depressed. Last, FIG. 5 illustrates use of alternating ribs (88) and notches (90) on a portion of outer surface of barrel (32). Notches (90) are designed to be engageable with plunger engagement slide (52) to provide a positive means of preselecting location of plunger assembly (30) in bore (41).

FIG. 5 provides another view of plunger lock disc (36) and also a whistle (42). Whistle (42) may be of the reed type where a reed partially obscures a port, the port for communication of air from within barrel (32) to outside barrel (32), so as to vibrate the reed.

Figure 6:
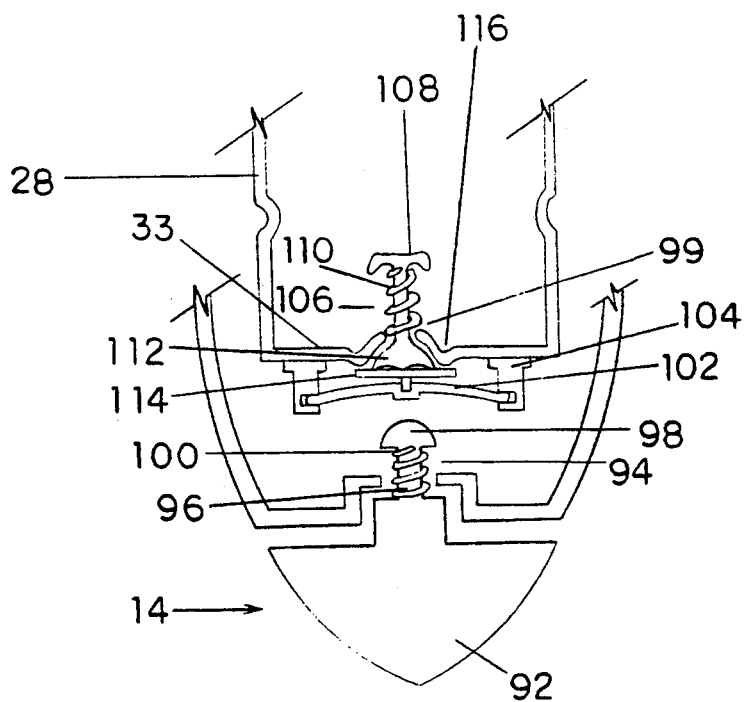
FIG. 6 illustrates a cross-sectional view of the valve means of Applicant's present invention.

Turning now to FIG. 6, FIG. 6 illustrates a cross-sectional elevational view and an alternate preferred embodiment of the valve assembly of Applicant's present invention. It is to be understood that the valve assembly of Applicant's present invention allows gas to normally pass from barrel (32) to the valve assembly in end wall (33) of inner sleeve (28). Piston (78) moving through bore (41) toward head (14) will force compressed air through orifice (99) into chamber (31). This will inflate the condom. However, following inflation Applicant's unique valve assembly provides for the ability to create a suction at air holes (20) (FIG. 1), to allow for ease of rerolling the condom off the cylindrical member (12). This can be appreciated by understanding the structure and operation of nose cone (92) at head (14). As can be seen in FIG. 6, nose cone (92) is retained flush against head (14) (for purposes of clarity of illustration, there is a separation shown in FIG. 6) by the action of bias means (94). Bias means (94) is comprised of rod (96), cap (98) and spring (100). Bias means (94) is provided to normally bias nose cone (92) against head (14). However, when the user requires suction to hold the sheath of the condom to body (16), so as to facilitate rerolling of the condom in a smooth fashion, Applicant will depress release button (48) which, when piston (78) is against stop ring (29) (see FIG. 4), will force stop (108) to urge clip (102) from its normal slightly convex position (as illustrated in FIG. 6) to a concave position which will draw sealing ring (114) off of sealing lip (116). Thus, the valve assembly is locked in a position allowing the withdrawal of air from chamber (31) while piston (78) on plunger assembly (30) is withdrawn from bore (41).

Further details in FIG. 6 provide clip (102) to be set on brackets (104) with retainment means (106) urging the valve assembly to a normally closed position with sealing (114) mounted on head (112) to be flush against sealing lip (116). By with-drawing the piston after setting the valve assembly in a vacuum position, then engaging plunger engagement slide (52) against notches (90) a vacuum may be maintained while the condom is unrolled from cylindrical member (12).

To reset the one-way valve assembly illustrated in FIG. 6 to its normal position, the consumer must merely depress nose cone (92) which will "pop" clip (102) to the convex position as illustrated in FIG. 6 and provide for reseating of sealing ring (114) against sealing lip (116).

Figure 7:
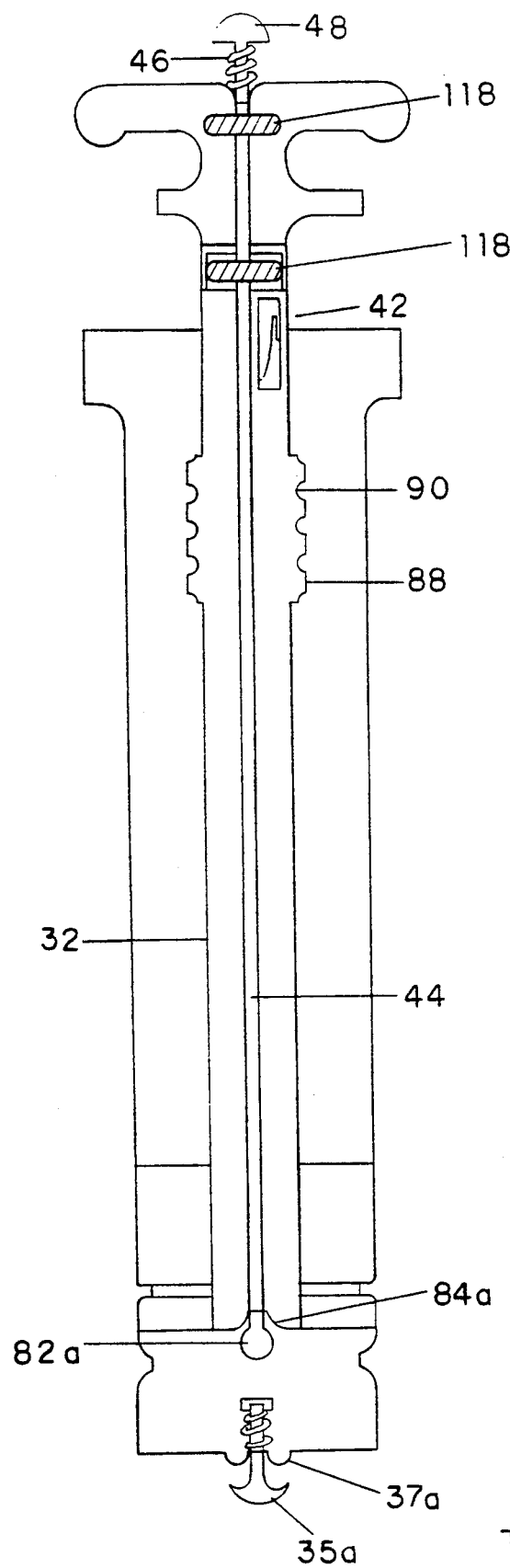
FIG. 7 provides a cross-sectional view of an alternate preferred embodiment of Applicant's present invention.

FIG. 7 illustrates in cross-sectional view an alternate preferred embodiment of Applicant's present invention. Here it is seen that there may be modifications made to the valve assembly, more specifically, rod (44) may be provided with a ball (82a) instead of nipple (82) and a seat (84a) instead of sealing collar (84). Functionally, both embodiments are the same. Likewise, flap valve (35) with hinge (37) may be replaced by ring-shaped member (35a) engageable with lip (37a) dimensioned to engage the same.

Figure 8:
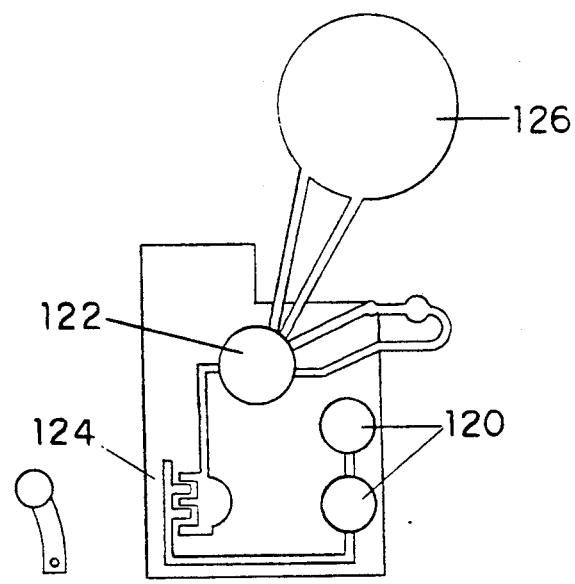
FIG. 8 provides an elevational view of a commercially available, pressure-activated chime or electronic chime board for use in the barrel of the plunger assembly of Applicant's present invention to produce an audio signal responsive to air escaping from the inflated condom.

FIG. 7 also provides for an additional embodiment whereby whistle (42) heretofore described as having a reed port (42) in which air escaping therefrom to create a sound, is replaced with chip unit (118) as set forth in FIG. 8. Chip unit (118) is an electronically powered chime that is commercially available through Archer/Radio Shack as Model No. 555 Timer. Chip unit (118) is quite small and will easily fit within sleeve (32) and may be mounted adjacent reed port (42). Basically, chip unit (118) is powered by batteries (120), connected to microcircuit (122) to process signals picked up at vibrating transducer (pickup) (124) and sent to speaker (126) to provide an audible pitch if the permeability of the condom is such that it provides sufficient air flow through the reed port (42) of the whistle.

Turning now to the method of use of the device of Applicant's present invention, it is seen that Applicant provides for condom testing device (10). The structure of condom testing device (10) as well as the structure and function of a condom will be assumed. Briefly, condom testing device of Applicant's present invention provides for a first step of unrolling a condom from a place that the head of the cylindrical member and unrolled to the base of the member, whereupon a quick visual inspection is provided.

Secondly, condom testing device of Applicant's present invention provides for air inflation of the condom to check for the integrity of the sheath and for the porosity of the sheath. Release of the captured air will provide a whistle tone.

Third, for those individuals who engage in high risk sex, such as gays or individuals whose spouses are HIV positive, may take the third step and perform a hydraulic test. The paragraph below sets forth the three methods of testing the condom using the device of Applicant's present invention.

Unrolling the condom over the cylindrical member of the condom testing device provides for the ability to visually inspect the entire working surface of the sheath for tears, perforations or ridges. Ridges or ripples in the surface where the sheath is not smooth and uniform are indicative of seams inadvertently created during the manufacture process. Most of these are caught by the quality control at the manufacturing site, but nonetheless, some occasionally pass through. The ripples provide a weak point and a potential source of breakage.

The following visual inspection of the unsheathed condom the collar lock ring is used to secure the condom tightly against the perimeter channel. Inflation using the plunger is begun by providing two strokes to the plunger and then locking the plunger assembly in the inner sleeve by using the plunger lock disc and flange locking lip assembly as described above. With a collar lock ring providing an air-tight seal between the sheath and the cylindrical member and with the sheath of the condom partially inflated about the cylindrical member, the visual inspection can proceed. During the inflation process, tears or perforations that were not revealed during the visual inspection and which occurred after the manufacture of the sheath will probably result in total rupture of the latex sheath. However, perforations or small tears that occurred during the manufacturing process will likely produce only a slow leak. However, the inflation process will help point up such manufacturing imperfections both visually and also aurally. The inflation test will also allow the user to observe the size of the inflated sheath for a ten- to twenty-second period to determine whether or not there has been any visible deflation. If there has not, the integrity of the sheath should be satisfactory. However, approximately twenty seconds after inflation, a button release should be depressed to allow the compressed air in the inflated sheath to migrate through the air holes and the barrel and out the whistle. After a period of use with a two-pump inflation and about a twenty-second retainment time, the user should recognize the pitch of the whistle that is indicative of sheath integrity. As it is, if the user has been used to Brand A, inflated with two strokes of the piston for a retainment time of twenty seconds, they would recognize a particular pitch produced by the whistle. A lower pitch, indicative of lower air velocity through the whistle, would be evidence of increased porosity and weaker sheath integrity. Thus the audio signal provided by the whistle provides a means of further checking sheath integrity.

To completely test the condom with Applicant's novel device, the condom is secured on the air chamber and the air chamber is pumped-up per instructions. The plunger is turned into the locking collar. This secures the position of the plunger and allows a visual inspection of the surface of the condom under an inflated condition; the condom must hold air pressure.

Any manufactured defects or shelf damage or possible product tampering will compromise the air holding ability of the condom. Holes, tears or visual imperfections of the condom will constitute a useless product with no safety health value for the user. The condom should be discarded and another selected to test.

If the condom holds air pressure and has no visual imperfections, the rod spring located at the handle can be depressed and an audio sound should be heard from the air pressure escaping from the barrel chamber. If no sound is heard, the condom could have a defect condition and should be rejected as defective. In such a situation where a condom that holds air pressure is suspect of defect and in situation of high risk sexual activity where individuals want more testing, Applicant's novel device involves a glass jar filled with commercially available liquid (biocompatible and latex compatible) such as Nonoxynol to be used for a hydraulic test.

The hydraulic test requires the air chamber to be reinflated and the condom to be once more visually inspected. With the plunger locked in place, the condom can be submerged into the jar of liquid and a visual inspection for escaping air can be conducted. If no air bubbles are found, the condom can be considered up to manufactured specification and can be re-rolled as per instructions.

At this point, it is well to look at FIG. 4 in conjunction with FIG. 5 to determine how the air retained in inflated sheath is released through the whistle. Plunger assembly (30) is dimensioned such that when crown (80) rests against stop ring (29) plunger lock disc (36) will be adjacent flange locking lip (38). After the first or second stroke (depending upon how many strokes are used for inflation of the sheath), plunger assembly is locked such that crown (80) is against stop ring (29). Visual inspection of the insulated sheath is then performed. After the proper retainment time, release button (48) is depressed. Such an action will provide for the extension of nipple (82) which will result in the contact and lifting of flap valve (35). During the inflation process, flap valve will act to normally allow air to pass one way from bore (41) into chamber (31) and thereby pass through air holes (20) and inflate the sheath. That is, hinge (37) normally biases flap valve (35) so it fits sealingly against end wall (33) to provide an air-tight seal at port (39). However, when the sheath is inflated, air pressure and the bias at hinge (37) prevent the escape of air from the inflated sheath. However, the action of nipple (82) against flap valve (35) will allow the pressurized air in the inflated sheath and chamber (31) to travel through port (39) and through barrel (32) out whistle (42).

Once the test is completed satisfactorily, the rod spring located on top of the plunger is depressed and releases the inflated air. If the plunger is now pulled out and locked in its extended position with the sliding latch; a vacuum is formed in the chamber that will firmly hold the contraceptive in position to be re-rolled and ready for use as a health aid. Applicant's novel device uses air pressure to test the contraceptive and a vacuum to hold it in place for re-rolling.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A device for testing the integrity of the sheath of a resilient membrane condom, the device comprising:

a hollow cylindrical member having a body with walls defining a multiplicity of air holes therethrough, the hollow cylindrical member defining a head at a closed end thereof and a base at an open end thereof, the cylindrical member dimensioned to receive the sheath of the condom snugly on the outer surface thereof, said cylindrical member with walls defining an inner chamber;

means for affecting an air tight sealing of the membrane of the sheath to said cylindrical member; and plunger assembly, said plunger assembly insertable into said cylindrical member to provide for the movement of air through the air holes of said cylindrical member thereby allowing inflation and deflation of the sheath of the condom;

wherein inspection of the condom is performed while the condom is unrolled on said cylindrical member and during inflation thereof, while the condom may be easily rerolled off said cylindrical member following deflation.

2. The device of claim 1 further comprising:

an inner sleeve with inner walls defining a bore therein, and having an end wall, the inner sleeve for receipt within the inner chamber of said cylindrical member so as to define an interchamber, the interchamber between the inner walls of said cylindrical member and the outer walls of said inner sleeve; and valve means for controlling the communication of air between the bore of said inner sleeve and the interchamber.

3. The device of claim 2 further comprising valve activation means, in operative association with said plunger assembly to activate said valve means.

4. The device of claim 3 further comprising audio means in communication with air escaping the inflated condom sheath to provide an audio signal responsive to the velocity of air escaping therethrough.

5. The device of claim 4 wherein said plunger assembly comprises a hollow barrel with a piston at a first end thereof and a handle at the second end thereof, said piston dimensioned for substantially air tight receipt within the bore of said inner sleeve, the piston having face, the face cooperating with said valve activation means to engage said valve means and control the air movement between the condom and the bore.

6. The device of claim 5 wherein said valve activation means further comprises a rod extending from point removed from the barrel axially along the longitudinal axis within the barrel and through said piston, terminating at a nipple, the rod capable of urging the nipple against said valve means to operate the same.

7. The device of claim 6 further comprising a means to lock said plunger assembly within the bore of said inner sleeve.

8. The device of claim 7 wherein the lock means further comprises a first locking member integral with the barrel of said plunger assembly and a second locking member integral with the base of said cylindrical member.

9. The device of claim 8 wherein the base of said cylindrical member further comprises a flange, the flange for mounting the second locking member of said locking means to said cylindrical member.

10. The device of claim 9 wherein the base of said cylindrical member is threadably engaged to the body of said cylindrical member.

11. The device of claim 10 wherein said means for effecting an airtight sealing of the membrane of the sheath of said cylindrical member comprises a perimeter channel in the outer surface of said cylindrical member near the base thereof and a locking collar ring to snugly urge the membrane of the sheath of the condom against the walls of the channel of said cylindrical member when secured thereto.

12. The device of claim 11 further comprising a means to selectively set the barrel of said plunger means at a position intermediate a fully inserted and a fully removed position in the bore of said inner sleeve.

13. The device of claim 5 wherein said inner sleeve further comprises a stop ring integral with the walls thereof to provide for a seat to air seal the face of said piston thereto when the piston is fully inserted into said inner sleeve.

14. A device for testing the integrity of the sheath of a condom having a resilient membrane, the device comprising:

a cylindrical member between 6 and ten inches long and between one and two inches in diameter, the cylindrical member having outer walls and inner walls, the inner walls defining a bore therein, the outer walls and inner walls with an interchamber therebetween, the outer walls with air holes therethrough, the inner walls comprising cylindrical sidewalls, and an end wall, said cylindrical member having a head at one end thereof and an open end at a base thereof;

valve means to control the communication of gas through the inner walls of said cylindrical member, said valve means comprising a check valve in the end wall of the inner walls of said cylindrical member for allowing air to flow from the bore into the interchamber of said cylindrical member;

plunger means with a hollow barrel having a piston at one end thereof and a handle at the other end thereof;

valve activation means, integral with said plunger means, for engagement with said valve means such that a gas may pass from the interchamber of said cylindrical member to the bore of the cylindrical member.

15. The device of claim 14 wherein the outer walls of said cylindrical member are comprised of soft latex.

16. The device of claim 14 further comprising a means for retaining the sheath of the condom in air tight fashion to the outer walls near the base of said cylindrical member.

17. The device of claim 16 further comprising audio signal means integral with said plunger means for creating an audio signal when air passes through it.

18. The device of claim 17 wherein said retaining means comprises a collar lock ring and walls defining a channel in the outer walls of said cylindrical member near the base thereof, for sealing the sheath of the condom in the channel in air tight fashion between the collar lock ring and the outer walls of said cylindrical member.

19. The device of claim 14 further comprising vacuum means to retain the condom to the sheath.

20. The device of claim 19 wherein said vacuum means comprises a means to selectively set the barrel of said plunger means at a position intermediate a fully inserted and a fully removed position in the bore of said inner sleeve.

21. A method for determining the integrity of a condom made from an elastic membrane sheath, the method comprising;

providing a cylindrical member having outer walls with air holes therethrough, said cylindrical member dimensioned to be slightly larger in diameter than the condom sheath, the cylindrical member with a head at one end and an open end at a base thereof, and a plunger means for inflating and deflating the same, the cylindrical member insertable into the cylindrical member, and having a means to provide an audio signal responsive to the permeability of the condom;

unrolling the sheath of the condom over the cylindrical member;

sealing the sheath to the base of the cylindrical member;

inflating the condom with the plunger means;

inspecting the condom sheath for integrity;

waiting for a preselected period to determine if any deflation is occurring;

deflating the condom;

detecting the presence of an audio pitch;

comparing the audio pitch to a known standard;

securing the deflated sheath to the cylindrical member at the air holes thereof;

rerolling the condom off the cylindrical member.

* * * * *